(12) United States Patent
Nadler et al.

(10) Patent No.: US 10,049,495 B2
(45) Date of Patent: Aug. 14, 2018

(54) SYSTEM AND METHOD FOR PROVIDING VIRTUAL REALITY CONTENT

(71) Applicant: Hashplay Inc., San Francisco, CA (US)

(72) Inventors: Ingo Nadler, Bad Breisig (DE); Jan-Philipp Alexander Mohr, Hamburg (DE)

(73) Assignee: Hashplay Inc., San Francisco, CA (US)

( * ) Notice: Subject to any disclaimer, the term of this patent is extended or adjusted under 35 U.S.C. 154(b) by 233 days.

(21) Appl. No.: 14/994,750

(22) Filed: Jan. 13, 2016

(65) Prior Publication Data

US 2016/0203646 A1    Jul. 14, 2016

Related U.S. Application Data

(60) Provisional application No. 62/103,087, filed on Jan. 14, 2015, provisional application No. 62/180,120, (Continued)

(51) Int. Cl.
| | |
|---|---|
| G06T 19/00 | (2011.01) |
| A63F 13/52 | (2014.01) |
| H04N 13/344 | (2018.01) |
| G02B 27/01 | (2006.01) |
| A63F 13/86 | (2014.01) |

(52) U.S. Cl.
CPC .......... G06T 19/006 (2013.01); A63F 13/52 (2014.09); G02B 27/017 (2013.01); H04N 13/344 (2018.05); A63F 13/86 (2014.09); G02B 2027/0134 (2013.01)

(58) Field of Classification Search
CPC .... G06T 19/006; G06T 3/0018; G06T 3/0043
See application file for complete search history.

(56) References Cited

U.S. PATENT DOCUMENTS

| | | | |
|---|---|---|---|
| 2009/0091612 A1* | 4/2009 | Sekizawa | G03B 35/18 |
| | | | 348/43 |
| 2010/0192210 A1* | 7/2010 | Purdy, Sr. | G06F 21/10 |
| | | | 726/7 |

(Continued)

OTHER PUBLICATIONS

Haines, Eric, and Tomas Akenine-Moller. "Real-time rendering." 2nd ed. (2002), pp. 61-66 and 675-679.*

*Primary Examiner* — Daniel Hajnik
(74) *Attorney, Agent, or Firm* — Ziegler IP Law Group, LLC

(57) ABSTRACT

There is provided a system for providing virtual reality content. The system includes a computing arrangement that is operable to execute image generating instructions to process the virtual reality content to generate image data, and a display arrangement that is operable to render the generated image data. The computing arrangement, when executing the image generating instructions, is operable to intercept drawing calls to one or more graphics libraries from application software that executes in operation in computing hardware of a user-wearable device of the system, or to intercept drawing calls from the one or more graphics libraries to a graphics driver of the display arrangement, wherein the user-wearable device includes the display arrangement; and to modulate camera and projection matrices of the drawing calls to create two images having a substantially hemi-spherical field of view for presentation to corresponding eyes of the user.

20 Claims, 9 Drawing Sheets

Related U.S. Application Data filed on Jun. 16, 2015, provisional application No. 62/233,451, filed on Sep. 28, 2015, provisional application No. 62/260,280, filed on Nov. 26, 2015.

(56) References Cited

U.S. PATENT DOCUMENTS

| | | | |
|---|---|---|---|
| 2014/0063055 A1* | 3/2014 | Osterhout | G06F 3/005 345/633 |
| 2015/0087414 A1* | 3/2015 | Chen | A63F 13/355 463/31 |
| 2015/0321103 A1* | 11/2015 | Barnett | G06T 19/006 345/419 |

* cited by examiner

SYSTEM AND METHOD FOR PROVIDING VIRTUAL REALITY CONTENT

TECHNICAL FIELD

The present disclosure relates to systems for providing virtual reality content, for example 180° virtual reality content and 3-D live broadcasting content. Moreover, the present disclosure concerns apparatus for use in implementing aforesaid systems, for example apparatus including portable user-wearable image presentation devices. Moreover, the present disclosure relates to methods of providing aforementioned virtual reality content. Furthermore, the present disclosure is concerned with computer program products comprising a non-transitory computer-readable storage medium having computer-readable instructions stored thereon, the computer-readable instructions being executable by a computerized device comprising processing hardware to execute aforesaid methods.

BACKGROUND

Various types of image display devices have been developed during the past decades of time. More recently, by employing Liquid-Crystal Display (LCD), Light-Emitting Diode (LED), Organic LED (OLED), and thin-film transistor technologies, it has become feasible to miniaturize image display devices, and yet achieve an impressive degree of display pixel resolution. Such miniaturization has allowed 3-dimensional (3-D) head-worn imaging apparatus to be manufactured, for example for providing users with a 3-D immersion experience, for example when playing computer games, when implementing professional flight simulators, and similar.

However, when creating a 3-D image sequence, for example an animated video, using one or more data processors, considerable computing capacity is required. Moreover, software executing upon the one or more data processors has to be configured to execute efficiently on the one or more data processors, in order for users to receive a smooth realistic 3-D experience.

Such software is conventionally implemented using software applications that render 3-D graphics data by calling upon one or more drawing functions in one or more databases, namely "libraries", provided by an operating system coordinating the aforesaid one or more data processors, such as OpenGL and Direct3D; "OpenGL" and "Direct3D" are registered trademarks. In turn, in a hierarchical manner, these one or more drawing functions call upon lower level drawing functions in display-driver software associated with graphics hardware.

Moreover, in conventional operation, a view to be experienced by a given user is typically drawn from a perspective of a camera positioned in a given scene. The software, when executed on the one or more data processors, results in additional matrix multiplications being performed that change various parameters, for example a field of view and such like. Moreover, such multiplications usually include use of a camera matrix, a world matrix and a projection matrix as a part of computations executed by the one or more data processors.

In an example implementation, one or more displays, that are provided with processed image data for display to a given user, are housed in a head-mountable apparatus, namely a "head mounted unit", that is operable to provide two distinctive viewing perspectives of a given synthesized scene to each respective eye of the given user. Thus, the given user, in operation of the apparatus, is able to turn his/her head to look around as desired, and the software is operable to modify images presented in the one or more displays accordingly so as to provide the user with a sense of full immersion within the given synthesized scene.

A contemporary augmented reality system typically superimposes a virtual scene over an image of a real environment. Mostly, this requires a fixed view target and an interactive change of the viewing location, for example when the user is looking from different sides of a table with a virtual model placed upon a horizontal upper surface of the table.

Thus, as elucidated in the foregoing, contemporary virtual reality systems employ 180° or 360° monoscopic or stereoscopic video or imagery to create a sense of immersion. These virtual reality systems allow their users to rotate their heads during such a sense of immersion, namely to look around. However, such contemporary known systems are unable to react to a change in a given user's location within the scene in a satisfactory realistic manner, for example when skewing to look around a corner within the scene, and so forth. Such a lack of reaction is capable of potentially destroying, at least momentarily, an illusion to the given user of total immersion within the scene.

Moreover, in contemporary times, there is only a very limited availability of content for virtual reality systems, and satisfactory solutions for creating required views from contemporary software applications such as computer games, and for streaming such views via a data communication network, for example the contemporary Internet. Known approaches generate, for example, virtual reality (VR) content with required views only on a spatially local basis.

Contemporary interactive devices, for example computing devices, gaming consoles and workstations, employ a contemporary arrangement of software applications being run in monoscopic 3-D, namely having only a single perspective. However, there exist methods of converting data output of such monoscopic 3-D software applications into stereoscopic 3-D with two perspectives, for example for purposes of simulation and gaming. Typically, such stereoscopic output can be in a variety of potential formats, for example side-by-side, top-down or frame-interleaved or even time-interleaved, wherein the variety of formats can be displayed using four data buffers that include two front data buffers concerning visible left and right scenes and two back data buffers concerning invisible left and right scenes. In operation, either a given software application or a graphic driver employed outputs a correspondingly synthesized image to an attached stereoscopic viewing device, such as a Virtual Reality (VR) device, a monitor or a projector with an associated user employing active shutter glasses, a 3-D television with any other form of glasses (e.g. polarization glasses), or even a new glasses-free 3-D television.

Furthermore, there exist systems that are operable to capture and to stream a 2-dimensional (2-D) image representation, namely a "monoscopic image" representation, via a data communication network, for example the Internet, for example via a web browser or a software application of a mobile telephone. In such a known arrangement, a content delivery system distributes live content from an ingest server potentially to the entire World. However, a geographical proximity of the ingest server determines a quality of feed of such live content, for example based upon data communication bandwidth limitations. In such operation, a unique Uniform Resource Locator (URL) is provided by the ingest server to inject the live content as a data stream.

SUMMARY

The present disclosure seeks to provide an improved system for providing virtual reality content.

The present disclosure also seeks to provide an improved method for providing virtual reality content.

Moreover, the present disclosure seeks to provide an improved user-wearable device for use with the aforesaid system.

Furthermore, an aim of the present disclosure is at least partially to overcome at least some of problems of the prior art, as elucidated above.

In a first aspect, embodiments of the present disclosure provide a system for providing virtual reality content, wherein the system includes a computing arrangement that is operable to execute image generating instructions to process the virtual reality content to generate image data, and a display arrangement that is operable to receive the generated image data and to provide one or more corresponding images that are viewed by a user in operation for receiving a virtual reality experience, characterized in that the computing arrangement, when executing the image generating instructions, is operable:

(i) to intercept one or more drawing calls to one or more graphics libraries from application software that executes in operation in computing hardware of a user-wearable device of the system, or to intercept one or more drawing calls from the one or more graphics libraries to a graphics driver of the display arrangement, wherein the user-wearable device includes the display arrangement; and (ii) to modulate camera and projection matrices of the one or more drawing calls to create two images having a substantially hemi-spherical field of view for presentation to corresponding eyes of the user.

In a second aspect, embodiments of the present disclosure provide a method of operating a system for providing virtual reality content, wherein the system includes a computing arrangement that is operable to execute image generating instructions to process the virtual reality content to generate image data, and a display arrangement that is operable to receive the generated image data and to provide one or more corresponding images that are viewed by a user in operation for receiving a virtual reality experience, characterized in that the method includes:

(a) operating the computing arrangement to execute the image generating instructions to intercept one or more drawing calls to one or more graphics libraries from application software that executes in operation in computing hardware of a user-wearable device of the system, or to intercept one or more drawing calls from the one or more graphics libraries to a graphics driver of the display arrangement, wherein the user-wearable device includes the display arrangement; and (b) operating the computing arrangement to execute the image generating instructions to modulate camera and projection matrices of the one or more drawing calls to create two images having a substantially hemi-spherical field of view for presentation to corresponding eyes of the user.

In a third aspect, embodiments of the present disclosure provide a system for providing a virtual reality experience to users, wherein the system includes a plurality of user devices coupled via a data communication network arrangement to a data server arrangement, wherein each user device includes computing hardware that is operable to execute program instructions to present to its user left and right images for providing the user with a three-dimensional (3-D) viewing experience, and wherein the data server arrangement includes a server computing arrangement for processing data thereat, characterized in that
the computing hardware of a given user device, when executing the program instructions, is operable:

(i) to capture the left and right images from left and right data buffers of the given user device;

(ii) to encode the captured images to generate encoded data; and (iii) to communicate the encoded data via the data communication network arrangement and the data server arrangement to other user devices for subsequent decoding and rendering thereat, wherein the data server arrangement is operable to determine, for a given receiving user device, an ingest server of the data server arrangement that is in a proximity of the given receiving user device, and to employ a time-stamped Universal Resource Locator (URL) for providing access to the encoded data.

In a fourth aspect, embodiments of the present disclosure provide a method of using a system for providing a virtual reality experience to users, wherein the system includes a plurality of user devices coupled via a data communication network arrangement to a data server arrangement, wherein each user device includes computing hardware that is operable to execute program instructions to present to its user left and right images for providing the user with a 3-D viewing experience, and wherein the data server arrangement includes a server computing arrangement for processing data thereat, characterized in that the method includes:

(a) operating the computing hardware of a given user device to execute the program instructions to capture the left and right images from left and right data buffers of the given user device;

(b) encoding the captured images to generate encoded data;

(c) communicating the encoded data via the data communication network arrangement and the data server arrangement to other user devices for subsequent decoding and rendering thereat;

(d) operating the data server arrangement to determine, for a given receiving user device, an ingest server of the data server arrangement that is in a proximity of the given receiving user device; and (e) operating the data server arrangement to employ a time-stamped URL for providing access to the encoded data.

In a fifth aspect, embodiments of the present disclosure provide a computer program product comprising a non-transitory computer-readable storage medium having computer-readable instructions stored thereon, the computer-readable instructions being executable by a computerized device comprising processing hardware to execute the method pursuant to the aforementioned second aspect or the aforementioned fourth aspect.

In a sixth aspect, embodiments of the present disclosure provide a user-wearable device that is operable to interact with a system pursuant to the aforementioned first aspect or the aforementioned third aspect, characterized in that the user-wearable device includes computing hardware and a display arrangement, wherein the computing hardware is operable to execute program instructions for intercepting one or more drawing calls to a graphics driver of the display arrangement and/or to one or more graphics libraries supporting operation of the display arrangement, wherein the computing hardware is operable to execute the program instructions to provide a 3-D virtual reality experience to one or more users via the display arrangement and/or to encode 3-D virtual reality display data into corresponding encoded data to be communicated via a data communication network to other such user-wearable devices.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
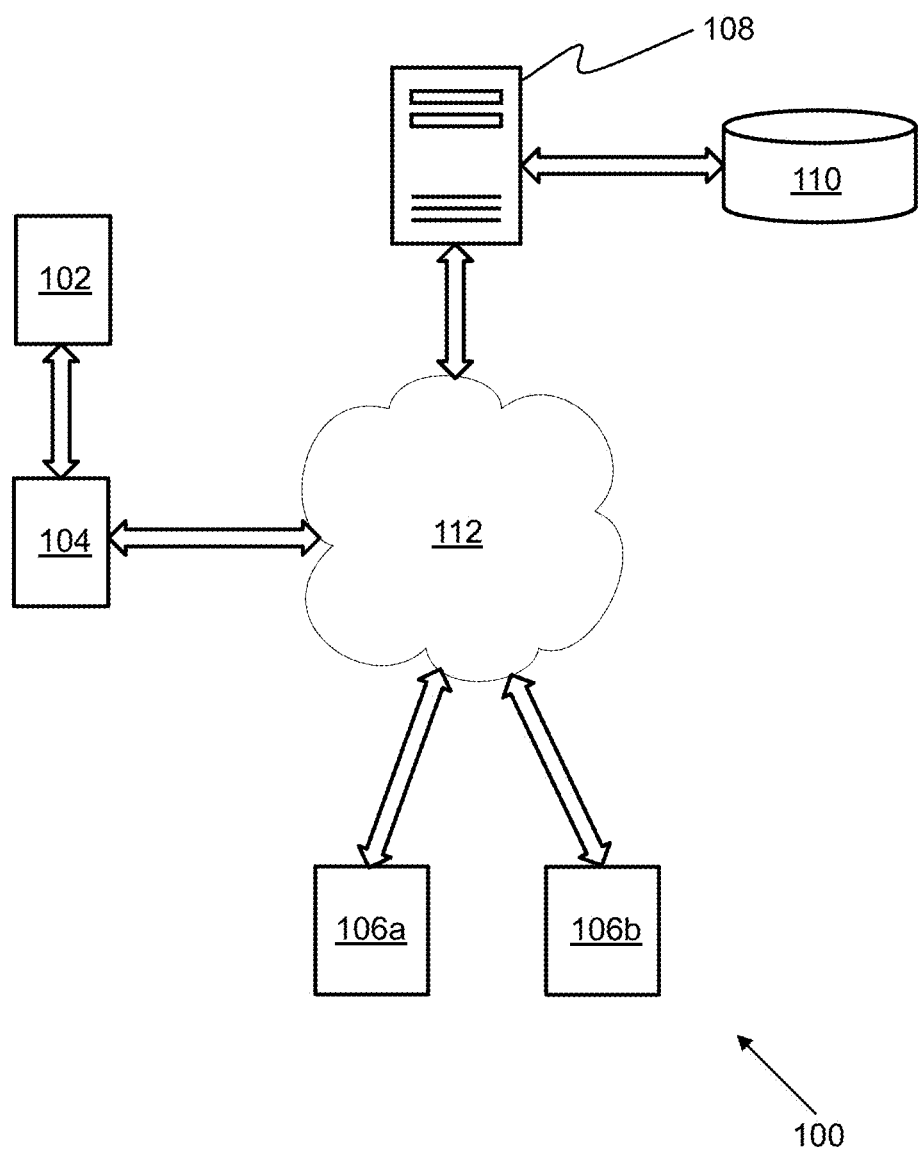
FIG. 1 is a schematic illustration of a network environment, wherein a system for providing virtual reality content is implemented pursuant to embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

Glossary

Brief definitions of terms used throughout the present disclosure are given below.

The term "substantially hemi-spherical field of view" refers to a field of view that is substantially enlarged in a horizontal direction as well as a vertical direction. Optionally, a substantially hemi-spherical field of view provides a larger horizontal as well as vertical field of view for both eye's perspective.

The term "server" generally refers to an application, program, process or device in a client/server relationship that responds to requests for information or services by another application, program, process or device (a client) on a communication network. The term "server" also encompasses software that makes the act of serving information or providing services possible.

The term "client" generally refers to an application, program, process or device in a client/server relationship that requests information or services from another application, program, process or device (a server) on a communication network. Importantly, the terms "client" and "server" are relative since an application may be a client to one application but a server to another application. The term "client" also encompasses software that makes the connection between a requesting application, program, process or device and a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based upon the present disclosure provided herein, one of ordinary skill in the art will appreciate a variety of ways in which connection or coupling exists in accordance with the aforementioned definition.

The terms "first", "second", and the like, herein do not denote any order, quantity, or importance, but rather are used to distinguish one element from another. Furthermore, the terms "a" and "an" herein do not denote a limitation of quantity, but rather denote the presence of at least one of the referenced item.

The phrases "in an embodiment", "in accordance with an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic; thus, the component or feature is to be regarded as being optional, in such case.

Embodiments of the Present Disclosure

In a first aspect, embodiments of the present disclosure provide a system for providing virtual reality content, wherein the system includes a computing arrangement that is operable to execute image generating instructions to process the virtual reality content to generate image data, and a display arrangement that is operable to receive the generated image data and to provide one or more corresponding images that are viewed by a user in operation for receiving a virtual reality experience, characterized in that the computing arrangement, when executing the image generating instructions, is operable:

(i) to intercept one or more drawing calls to one or more graphics libraries from application software that executes in operation in computing hardware of a user-wearable device of the system, or to intercept one or more drawing calls from the one or more graphics libraries to a graphics driver of the display arrangement, wherein the user-wearable device includes the display arrangement; and (ii) to modulate camera and projection matrices of the one or more drawing calls to create two images having a substantially hemi-spherical field of view for presentation to corresponding eyes of the user.

Preferably, the two images are created in a manner that one of the two images is offset, for example substantially horizontally, by an adjustable amount from the other of the two images, so as to provide perspective views corresponding to respective eyes of the user.

Optionally, the images further represent two distinctly different perspectives of a scene, alone or in combination with the offset images, created at an adjustable virtual camera distance.

In one implementation, the application software, when executing in operation, generates the two images itself. In such a case, the computing arrangement, when executing the image generating instructions, is operable to use an output of the application software.

In another implementation, the graphics driver generates the two images itself. In such a case, the computing arrangement, when executing the image generating instructions, is operable to locate these generated images.

According to an embodiment of the present disclosure, the computing arrangement, when executing the image generating instructions, is operable to render the two images into a single combined image. Optionally, in this regard, one of the two images that corresponds to a left eye of the user is rendered into an upper half of the single combined image, while the other of the two images that corresponds to a right eye of the user is rendered into a lower half of the single combined image. Alternatively, optionally, one of the two images that corresponds to the left eye of the user is rendered into a left half of the single combined image, while the other of the two images that corresponds to the right eye of the user is rendered into a right half of the single combined image.

Optionally, the computing arrangement, when executing the image generating instructions, is operable to normalize a view point and/or a view direction of the two images.

According to an embodiment of the present disclosure, the system is operable to encode the two images or the single combined image to generate corresponding encoded data. For this purpose, optionally, the system is operable to employ any suitable encoding method, for example such as H.264 and H.265, to encode a sequence of such images.

Optionally, the system is then operable to communicate the encoded data via a data communication network to user devices of one or more other users located at mutually different spatial locations. This enables the user devices to experience the virtual reality content even when the user devices do not execute application software that is similar to the application software being executed in the computing hardware of the user-wearable device.

More optionally, the computing arrangement, when executing the image generating instructions, is operable to obtain a stream ingest Uniform Resource Locator (URL) from a data server arrangement over the data communication network, and to stream the encoded data to the obtained URL. Computing hardware of a receiving user device is then operable to connect to the stream ingest URL to receive the encoded data for subsequent decoding and rendering thereat.

It will be appreciated that in providing the virtual reality experience, any suitable number of frames per second can be employed.

Additionally, optionally, the system is operable to time stamp the images and/or the encoded data for temporally synchronizing presentation of the images to the user and the one or more other users mutually to synchronize their virtual reality experiences.

According to another embodiment of the present disclosure, the system is operable to communicate information indicative of the intercepted drawing calls to the user devices of the one or more other users, via the data communication network. This enables computing hardware of the user devices to modulate camera and projection matrices of the intercepted drawing calls based upon current positions and angular orientations and/or turning angles of heads of their respective users.

Optionally, in this regard, the system is operable to normalize a view point and/or a view direction of the intercepted drawing calls.

Optionally, the system is operable to communicate the intercepted drawing calls themselves, including original camera and projection matrices that are then modulated based on the respective turning angles of heads of their respective users.

Optionally, the system is operable to time stamp the intercepted drawing calls for temporally synchronizing presentation to the user and the one or more other users mutually to synchronize their virtual reality experiences.

Additionally, optionally, the system is operable to communicate the information indicative of the intercepted drawings calls in an encoded form.

According to yet another embodiment of the present disclosure, the system is operable to record the intercepted drawing calls over a period of time, and to store information indicative of the intercepted drawing calls at a database associated with the data server arrangement for subsequent retrieval and rendering by the user devices of the one or more other users. Optionally, in this regard, the system is operable to normalize a view point and/or a view direction of the intercepted drawing calls. Additionally, optionally, the system is operable to store the information indicative of the intercepted drawings calls in an encoded form.

Moreover, according to an embodiment of the present disclosure, the user-wearable device includes an in-built motion and rotation sensor arrangement that is operable to sense a position and an angular orientation and/or turning angle of a head of the user when the user-wearable device is worn on the head. Optionally, the motion and rotation sensor arrangement includes at least one gyroscope and at least one accelerometer; the at least one gyroscope is optionally implemented as a vibrating Silicon micromachined device, and the at least one accelerometer is optionally implement as a Silicon micromachined device with at least one proof mass. Yet alternatively, the at least one gyroscope is implemented as an optical fiber ring gyroscopic device.

Optionally, the computing hardware of the user-wearable device is operable to render a portion of each of the two images that corresponds to the sensed position and the sensed angular orientation and/or turning angle of the head of the user, for display to a corresponding eye of the user to provide the virtual reality experience. As the sensed position and the sensed angular orientation and/or turning angle of the head of the user are indicative of a view point and a view direction of the user, such rendering potentially provides the user with a sense of full immersion, and allows the user not only to look around, but also to change his/her location to change his/her view point.

When allowing the user to change his/her view point, it is important to provide motion stabilization when rendering the portions of the two images. Optionally, the computing hardware of the user-wearable device is operable to compensate for user's motion by shifting a virtual view window over the respective images in a direction that is contrary to a direction of the user's motion. This results in a stabilized image that allows the user to look in a forward direction, and therefore, does not induce motion sickness with the user.

According to an embodiment of the present disclosure, the computing hardware of the user-wearable device is operable to apply a spherical distortion correction to the portion before display to the corresponding eye of the user via the display arrangement.

Moreover, optionally, the user devices of the one or more other users include user-wearable devices that are worn by their respective users. Optionally, each of these user-wearable devices includes an in-built motion and rotation sensor arrangement, for example implemented as aforementioned, that is operable to sense a position and an angular orientation and/or turning angle of a head of its respective user when that user-wearable device is worn on the head. This allows the one or more other users not only to look around, but also to change their location to change their view point.

According to an embodiment of the present disclosure, the computing arrangement, when executing the image generating instructions, is operable:
(iii) to receive from the user devices of the one or more other users interactive feedback data indicative of at least one of: a position of a head of a given user, an angular orientation and/or turning angle of the head of the given user, an input provided by the given user; and
(iv) to modify the two images based upon the interactive feedback data.

Examples of the input provided by the given user include, but are not limited to, joystick X and Y axes values, key press, and mouse movements.

Optionally, the computing arrangement, when executing the image generating instructions, is operable to provide an Application Programming Interface (API) or an extension to an existing graphics library that is facilitated by the application software. More optionally, this API or extension provides the interactive feedback data to the application software.

In a multiplayer game, the computing arrangement potentially allows a given player, namely the user, to see where other players, namely the one or more other users, are and/or what the other players are doing. Moreover, the computing arrangement potentially allows the other players to become a part of a game play. As an example, the other players may be manning guns on a plane that is flown by the given player.

For illustration purposes only, there will now be described an example network environment, wherein the aforementioned system for providing virtual reality content is implemented pursuant to embodiments of the present disclosure. One such network environment has been illustrated in conjunction with FIG. 1 as explained in more detail below.

The network environment includes a user-wearable device worn by a user, a computing arrangement, one or more user devices associated with one or more other users, a data server arrangement, and a data communication network. The data server arrangement includes at least one server and at least one database associated therewith.

The data server arrangement is coupled in communication with the user-wearable device and/or the computing arrangement via the data communication network. The data server arrangement is also coupled in communication with the one or more user devices via the data communication network.

The communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

In some implementations, the computing arrangement is included within the user-wearable device. In other implementations, the computing arrangement is implemented in a separate device that is coupled to the user-wearable device. Examples of such separate devices include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, and desktop computers. Some specific examples of the separate device include, but are not limited to, iPhone, iPad, Android phone, Android web pad, Windows phone, and Windows web pad (these names include registered trademarks).

Examples of the one or more user devices include, but are not limited to, user-wearable virtual reality devices, monitors or projectors with associated users employing active shutter glasses, three-dimensional (3-D) televisions with any other form of glasses (e.g. polarization glasses), and glasses-free 3-D televisions.

In some implementations, the one or more user devices are coupled to one or more user-wearable devices of the one or more other users. In such a case, examples of the one or more user devices include, but are not limited to, mobile phones, smart telephones, MIDs, tablet computers, UMPCs, phablet computers, PDAs, web pads, PCs, handheld PCs, laptop computers, and desktop computers. Some specific examples of the one or more user devices include, but are not limited to, iPhone, iPad, Android phone, Android web pad, Windows phone, and Windows web pad (these names include registered trademarks).

The system is operable to perform various operations as illustrated with respect to the aforementioned first aspect.

In a second aspect, embodiments of the present disclosure provide a method of operating a system for providing virtual reality content, wherein the system includes a computing arrangement that is operable to execute image generating instructions to process the virtual reality content to generate image data, and a display arrangement that is operable to receive the generated image data and to provide one or more corresponding images that are viewed by a user in operation for receiving a virtual reality experience, characterized in that the method includes:

(a) operating the computing arrangement to execute the image generating instructions to intercept one or more drawing calls to one or more graphics libraries from application software that executes in operation in computing hardware of a user-wearable device of the system, or to intercept one or more drawing calls from the one or more graphics libraries to a graphics driver of the display arrangement, wherein the user-wearable device includes the display arrangement; and (b) operating the computing arrangement to execute the image generating instructions to modulate camera and projection matrices of the one or more drawing calls to create two images having a substantially hemi-spherical field of view for presentation to corresponding eyes of the user.

According to an embodiment of the present disclosure, the method includes operating the computing arrangement to execute the image generating instructions to render the two images into a single combined image.

Optionally, the method includes operating the computing arrangement to execute the image generating instructions to normalize a view point and/or a view direction of the two images.

According to an embodiment of the present disclosure, the method includes operating the system to encode the two images or the single combined image to generate corresponding encoded data, and to communicate the encoded data via a data communication network to user devices of one or more other users located at mutually different spatial locations.

More optionally, the method includes operating the computing arrangement to execute the image generating instructions to obtain a stream ingest URL from a data server arrangement over the data communication network, and to stream the encoded data to the obtained URL.

Additionally, optionally, the method includes operating the system to time stamp the images and/or the encoded data for temporally synchronizing presentation of the images to the user and the one or more other users mutually to synchronize their virtual reality experiences.

According to another embodiment of the present disclosure, the method includes operating the system to communicate information indicative of the intercepted drawing calls to the user devices of the one or more other users, via the data communication network. This enables computing hardware of the user devices to modulate camera and projection matrices of the intercepted drawing calls based upon current positions and angular orientations and/or turning angles of heads of their respective users.

Optionally, in this regard, the method includes operating the system to normalize a view point and/or a view direction of the intercepted drawing calls.

Optionally, the method includes operating the system to time stamp the intercepted drawing calls for temporally synchronizing presentation to the user and the one or more other users mutually to synchronize their virtual reality experiences.

Additionally, optionally, the method includes operating the system to communicate the information indicative of the intercepted drawings calls in an encoded form.

According to yet another embodiment of the present disclosure, the method includes operating the system to record the intercepted drawing calls over a period of time, and to store information indicative of the intercepted drawing calls at a database associated with the data server arrangement for subsequent retrieval and rendering by the user devices of the one or more other users. Optionally, in this regard, the method includes operating the system to normalize a view point and/or a view direction of the intercepted drawing calls. Additionally, optionally, the method includes operating the system to store the information indicative of the intercepted drawings calls in an encoded form.

Moreover, according to an embodiment of the present disclosure, the method includes operating an in-built motion and rotation sensor arrangement of the user-wearable device to sense a position and an angular orientation and/or turning angle of a head of the user when the user-wearable device is worn on the head. The in-built motion and rotation sensor arrangement optionally includes at least one gyroscope that is implemented as a vibrating Silicon micromachined device, and at least one accelerometer that is implemented as a Silicon micromachined device with at least one proof mass. Yet alternatively, the at least one gyroscope is implemented as an optical fiber ring gyroscopic device.

Optionally, the method includes operating the computing hardware of the user-wearable device to render a portion of each of the two images that corresponds to the sensed position and the sensed angular orientation and/or turning angle of the head of the user, for display to a corresponding eye of the user to provide the virtual reality experience.

Optionally, the method includes operating the computing hardware of the user-wearable device to compensate for user's motion by shifting a virtual view window over the respective images in a direction that is contrary to a direction of the user's motion. This results in a stabilized image that allows the user to look in a forward direction, and therefore, does not induce motion sickness with the user.

According to an embodiment of the present disclosure, the method includes operating the computing hardware of the user-wearable device to apply a spherical distortion correction to the portion before display to the corresponding eye of the user via the display arrangement.

According to an embodiment of the present disclosure, the method includes operating the computing arrangement to execute the image generating instructions to receive from the user devices of the one or more other users interactive feedback data indicative of at least one of: a position of a head of a given user, an angular orientation and/or turning angle of the head of the given user, an input provided by the given user, and to modify the two images based upon the interactive feedback data.

Optionally, the method includes operating the computing arrangement to execute the image generating instructions to provide an API or an extension to an existing graphics library that is facilitated by the application software. More optionally, this API or extension provides the interactive feedback data to the application software.

In a third aspect, embodiments of the present disclosure provide a system for providing a virtual reality experience to users, wherein the system includes a plurality of user devices coupled via a data communication network arrangement to a data server arrangement, wherein each user device includes computing hardware that is operable to execute program instructions to present to its user left and right images for providing the user with a 3-D viewing experience, and wherein the data server arrangement includes a server computing arrangement for processing data thereat, characterized in that the computing hardware of a given user device, when executing the program instructions, is operable:

(i) to capture the left and right images from left and right data buffers of the given user device;

(ii) to encode the captured images to generate encoded data; and (iii) to communicate the encoded data via the data communication network arrangement and the data server arrangement to other user devices for subsequent decoding and rendering thereat, wherein the data server arrangement is operable to determine, for a given receiving user device, an ingest server of the data server arrangement that is in a proximity of the given receiving user device, and to employ a time-stamped URL for providing access to the encoded data.

The system potentially enables the data server arrangement to handle multiple concurrent broadcasts of the encoded data in an efficient manner.

Optionally, the computing hardware of the given user device, when executing the program instructions, is operable to request for a streaming ingest URL from the data server arrangement, and to check a time stamp of a received URL for validity before ingesting the encoded data to that URL.

According to an embodiment of the present disclosure, the data server arrangement is operable to maintains a list of ingest URL's. Optionally, the data server arrangement is operable to sort the list of ingest URL's based upon their respective ingest regions. Notably, there may be a plurality of URL's in a given ingest region.

Optionally, in order to determine the ingest server of the data server arrangement that is in the proximity of the given receiving user device, the data server arrangement is operable to determine a geographical location of the given receiving user device, for example using its Internet Protocol (IP) address. More optionally, the data server arrangement is operable to determine the ingest server in a dynamic manner, based upon the geographical location of the given receiving user device.

Additionally, optionally, the data server arrangement is operable to check account credentials of a user associated with the given receiving user device.

Optionally, when employing the time-stamped URL, the data server arrangement is operable to select a streaming ingest URL pertaining to the ingest server, and to send the streaming ingest URL together with a time stamp to the given receiving user device. More optionally, the streaming ingest URL is sent in an encoded form.

Additionally, optionally, the data server arrangement is operable to log the account credentials of the user associated with the given receiving user device and the streaming ingest URL sent to the given receiving user device for reporting purposes.

Moreover, according to an embodiment of the present disclosure, the computing hardware of the plurality of user devices, when executing the program instructions, are operable to render a given virtual reality experience mutually simultaneously via communication of the encoded data via the data communication network arrangement and the data server arrangement.

Furthermore, in one example implementation, the given user device includes a graphics board driver, and the computing hardware of the given user device, when executing the program instructions, is operable:

(iv) to intercept one or more drawings calls to the graphics board driver from a 3-D application that executes in operation in the computing hardware of the given user device;

(v) to modulate the one or more drawing calls to generate a second camera perspective image from a first camera perspective image; and (vi) to render the first and second camera perspective images into left and right back buffers, respectively, in preparation for swapping of corresponding front buffers with the back buffers, wherein the front buffers and the back buffers are used when generating images for display on a display arrangement of the given user device.

Optionally, in this regard, the first and second camera perspective images have a substantially hemi-spherical field of view, rather than a spherical field of view. This potentially saves computation time and network bandwidth required to process and transfer these perspective images.

In an alternative implementation, the graphics driver already generates a stereoscopic image. In such a case, the computing hardware of the given user device, when executing the program instructions, is operable to locate and read left and right perspective images from the front or back buffers of the graphics driver.

Optionally, in this regard, the left and right perspective images have a substantially spherical field of view. Optionally, the left and right perspective images are compressed into a single combined image, for example in a side-by-side manner or a top-down manner.

In yet another alternative implementation, the 3-D application already generates a stereoscopic image. In such a case, the computing hardware of the given user device, when executing the program instructions, is operable to read left and right perspective images from the 3-D application.

Optionally, in this regard, the left and right perspective images are compressed into a single combined image, for example in a side-by-side manner or a top-down manner, if not already provided in this manner by the 3-D application.

For illustration purposes only, there will now be considered an example network environment, wherein the aforementioned system for providing a virtual reality experience to users is implemented pursuant to embodiments of the present disclosure. One such network environment has been illustrated in conjunction with FIG. 2 as explained in more detail below.

The network environment includes a plurality of user devices, a data server arrangement, and a data communication network. The data server arrangement includes a plurality of ingest servers.

The data server arrangement is coupled in communication with the plurality of user devices via the data communication network.

The communication network can be a collection of individual networks, interconnected with each other and functioning as a single large network. Such individual networks may be wired, wireless, or a combination thereof. Examples of such individual networks include, but are not limited to, LANs, WANs, MANs, WLANs, WWANs, WMANs, the Internet, 2G telecommunication networks, 3G telecommunication networks, 4G telecommunication networks, and WiMAX networks.

Examples of the plurality of user devices include, but are not limited to, user-wearable virtual reality devices, monitors or projectors with associated users employing active shutter glasses, 3-D televisions with any other form of glasses (e.g. polarization glasses), and glasses-free 3-D televisions.

In some implementations, at least one of the plurality of user devices is coupled to a user-wearable device of at least one of the one or more other users. In such a case, examples of the at least one of the plurality of user devices include, but are not limited to, a mobile phone, a smart telephone, an MID, a tablet computer, a UMPC, a phablet computer, a PDA, a web pad, a PC, a handheld PC, a laptop computer, and a desktop computer. Some specific examples of the at least one of the plurality of user devices include, but are not limited to, iPhone, iPad, Android phone, Android web pad, Windows phone, and Windows web pad (these names include registered trademarks).

The system is operable to perform various operations as illustrated with respect to the aforementioned third aspect.

In a fourth aspect, embodiments of the present disclosure provide a method of using a system for providing a virtual reality experience to users, wherein the system includes a plurality of user devices coupled via a data communication network arrangement to a data server arrangement, wherein each user device includes computing hardware that is operable to execute program instructions to present to its user left and right images for providing the user with a 3-D viewing experience, and wherein the data server arrangement includes a server computing arrangement for processing data thereat, characterized in that the method includes:

(a) operating the computing hardware of a given user device to execute the program instructions to capture the left and right images from left and right data buffers of the given user device;
(b) encoding the captured images to generate encoded data;
(c) communicating the encoded data via the data communication network arrangement and the data server arrangement to other user devices for subsequent decoding and rendering thereat;
(d) operating the data server arrangement to determine, for a given receiving user device, an ingest server of the data server arrangement that is in a proximity of the given receiving user device; and
(e) operating the data server arrangement to employ a time-stamped URL for providing access to the encoded data.

Optionally, the method includes operating the computing hardware of the given user device to execute the program instructions to request for a streaming ingest URL from the data server arrangement, and to check a time stamp of a received URL for validity before ingesting the encoded data to that URL.

According to an embodiment of the present disclosure, the method includes operating the data server arrangement to maintain a list of ingest URL's, and to sort the list of ingest URL's based upon their respective ingest regions.

Optionally, the method includes operating the data server arrangement to determine a geographical location of the given receiving user device, for example using its IP address, in order to determine the ingest server of the data server arrangement that is in the proximity of the given receiving user device. More optionally, the method includes operating the data server arrangement to determine the ingest server in a dynamic manner, based upon the geographical location of the given receiving user device.

Additionally, optionally, the method includes operating the data server arrangement to check account credentials of a user associated with the given receiving user device.

Optionally, when employing the time-stamped URL, the method includes operating the data server arrangement to select a streaming ingest URL pertaining to the ingest server, and to send the streaming ingest URL together with a time stamp to the given receiving user device. More optionally, in the method, the streaming ingest URL is sent in an encoded form.

Additionally, optionally, the method includes operating the data server arrangement to log the account credentials of the user associated with the given receiving user device and the streaming ingest URL sent to the given receiving user device for reporting purposes.

Moreover, according to an embodiment of the present disclosure, the method includes operating the computing hardware of the plurality of user devices to execute the program instructions to render a given virtual reality experience mutually simultaneously via communication of the encoded data via the data communication network arrangement and the data server arrangement.

Furthermore, in one implementation, the given user device includes a graphics board driver, and the method includes:

(f) operating the computing hardware of the given user device to execute the program instructions to intercept one or more drawings calls to the graphics board driver from a 3-D application that executes in operation in the computing hardware of the given user device;
(g) operating the computing hardware of the given user device to execute the program instructions to modulate the one or more drawing calls to generate a second camera perspective image from a first camera perspective image; and
(h) operating the computing hardware of the given user device to execute the program instructions to render the first and second camera perspective images into left and right back buffers, respectively, in preparation for swapping of corresponding front buffers with the back buffers, wherein the front buffers and the back buffers are used when generating images for display on a display arrangement of the given user device.

In an alternative implementation, the graphics driver already generates a stereoscopic image. In such a case, the method includes operating the computing hardware of the given user device to execute the program instructions to locate and read left and right perspective images from the front or back buffers of the graphics driver.

Optionally, in the method, the left and right perspective images are compressed into a single combined image, for example in a side-by-side manner or a top-down manner.

In yet another alternative implementation, the 3-D application already generates a stereoscopic image. In such a case, the method includes operating the computing hardware of the given user device to execute the program instructions to read left and right perspective images from the 3-D application.

Optionally, in the method, the left and right perspective images are compressed into a single combined image, for example in a side-by-side manner or a top-down manner, if not already provided in this manner by the 3-D application.

In a fifth aspect, embodiments of the present disclosure provide a computer program product comprising a non-transitory computer-readable storage medium having computer-readable instructions stored thereon, the computer-readable instructions being executable by a computerized device comprising processing hardware to execute the method pursuant to the aforementioned second aspect or the aforementioned fourth aspect.

In a sixth aspect, embodiments of the present disclosure provide a user-wearable device that is operable to interact with a system pursuant to the aforementioned first aspect or the aforementioned third aspect, characterized in that the user-wearable device includes computing hardware and a display arrangement, wherein the computing hardware is operable to execute program instructions for intercepting one or more drawing calls to a graphics driver of the display arrangement and/or to one or more graphics libraries supporting operation of the display arrangement, wherein the computing hardware is operable to execute the program instructions to provide a 3-D virtual reality experience to one or more users via the display arrangement and/or to encode 3-D virtual reality display data into corresponding encoded data to be communicated via a data communication network to other such user-wearable devices.

DETAILED DESCRIPTION OF THE DRAWINGS

Referring now to the drawings, particularly by their reference numbers, FIG. 1 is a schematic illustration of a network environment 100, wherein a system for providing virtual reality content is implemented pursuant to embodiments of the present disclosure.

The network environment 100 includes a user-wearable device 102 worn by a user, a computing arrangement 104, one or more user devices associated with one or more other users, depicted as a user device 106a and a user device 106b in FIG. 1, a data server arrangement including at least one server and at least one database, depicted as a server 108 and a database 110 in FIG. 1, and a data communication network 112.

FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of user-wearable devices, computing arrangements, user devices, data server arrangements and data communication networks. A person skilled in the art will recognize many variations, alternatives, and modifications of embodiments of the present disclosure.

Figure 2:
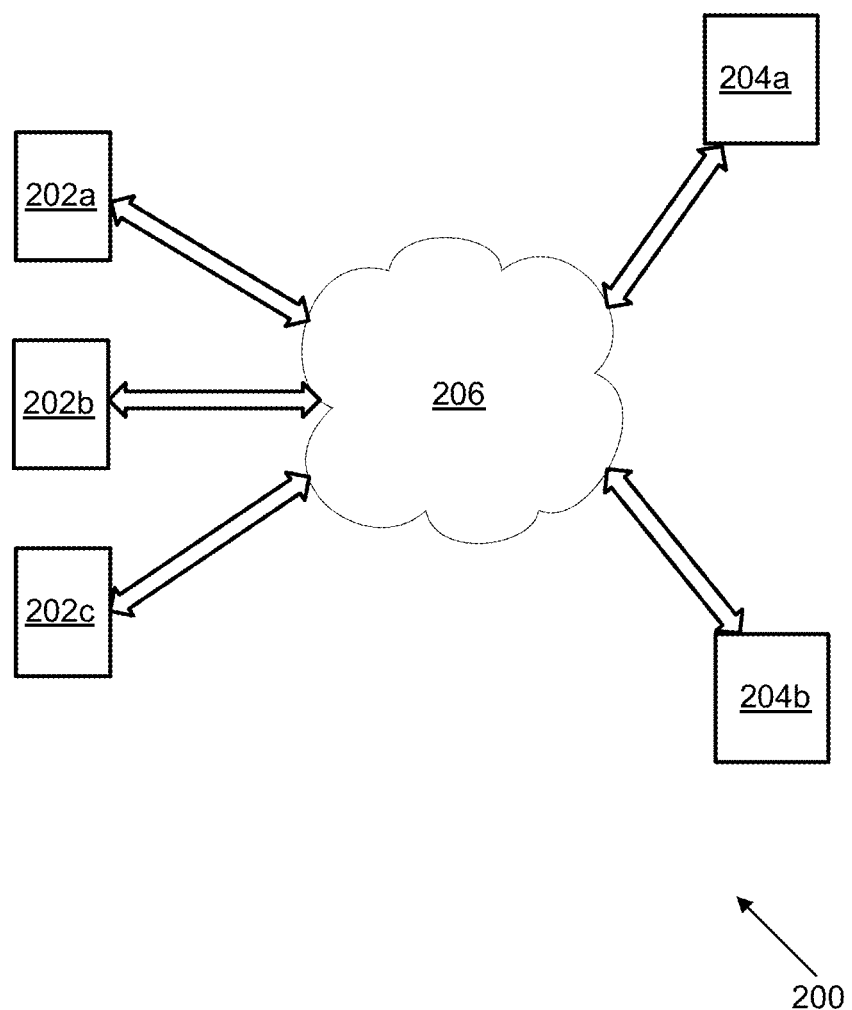
FIG. 2 is a schematic illustration of a network environment, wherein a system for providing a virtual reality experience to users is implemented pursuant to embodiments of the present disclosure.

FIG. 2 is a schematic illustration of a network environment 200, wherein a system for providing a virtual reality experience to users is implemented pursuant to embodiments of the present disclosure.

The network environment 200 includes a plurality of user devices, depicted as a user device 202a, a user device 202b and a user device 202c in FIG. 2, a data server arrangement including a plurality of ingest servers, depicted as an ingest server 204a and an ingest server 204b in FIG. 2, and a data communication network 206.

FIG. 2 is merely an example, which should not unduly limit the scope of the claims herein. It is to be understood that the specific designation for the network environment 200 is provided as an example and is not to be construed as limiting the network environment 200 to specific numbers, types, or arrangements of user devices, data server arrangements, ingest servers and data communication networks. A person skilled in the art will recognize many variations, alternatives, and modifications of embodiments of the present disclosure.

Figure 3A:
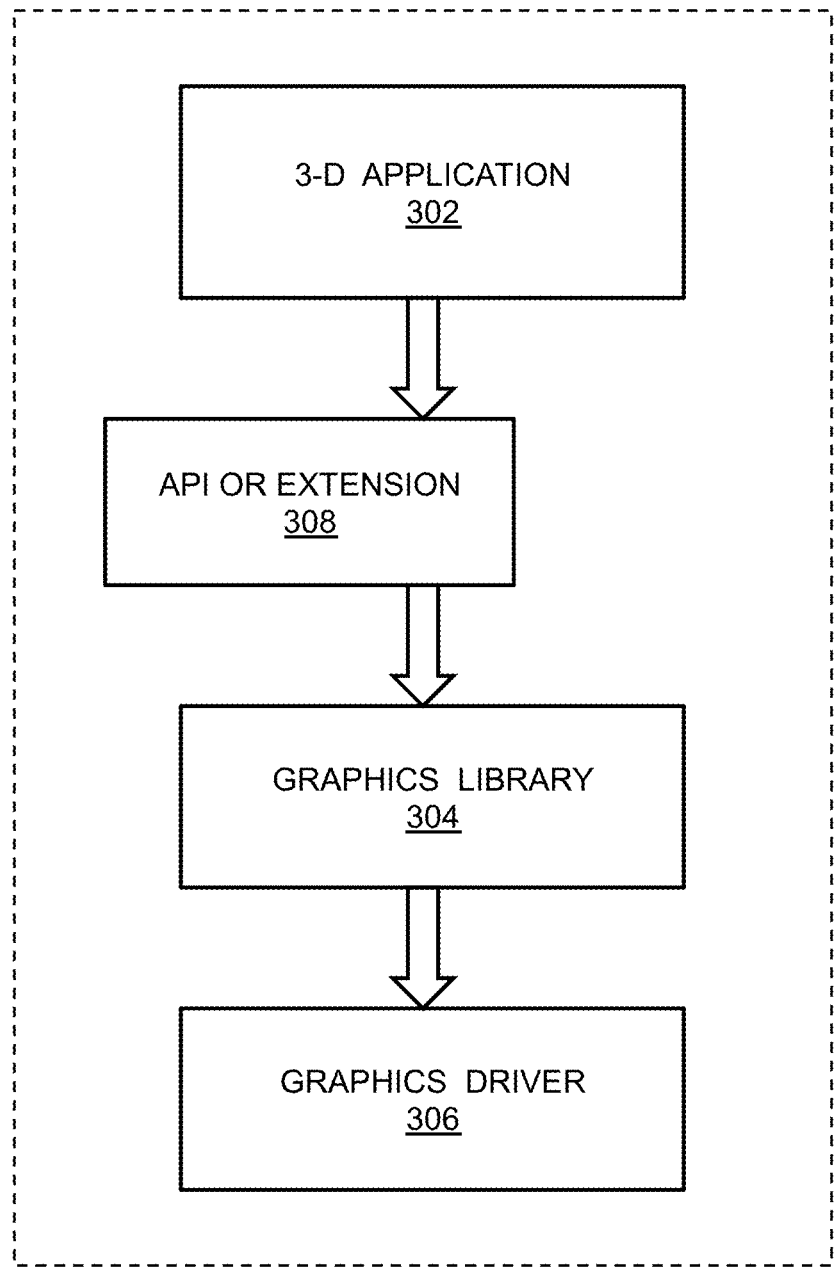
FIGS. 3A and 3B are schematic illustrations of processing performed at a given user-wearable device and a given receiving user device, respectively, in accordance with an embodiment of the present disclosure.
Figure 3B:
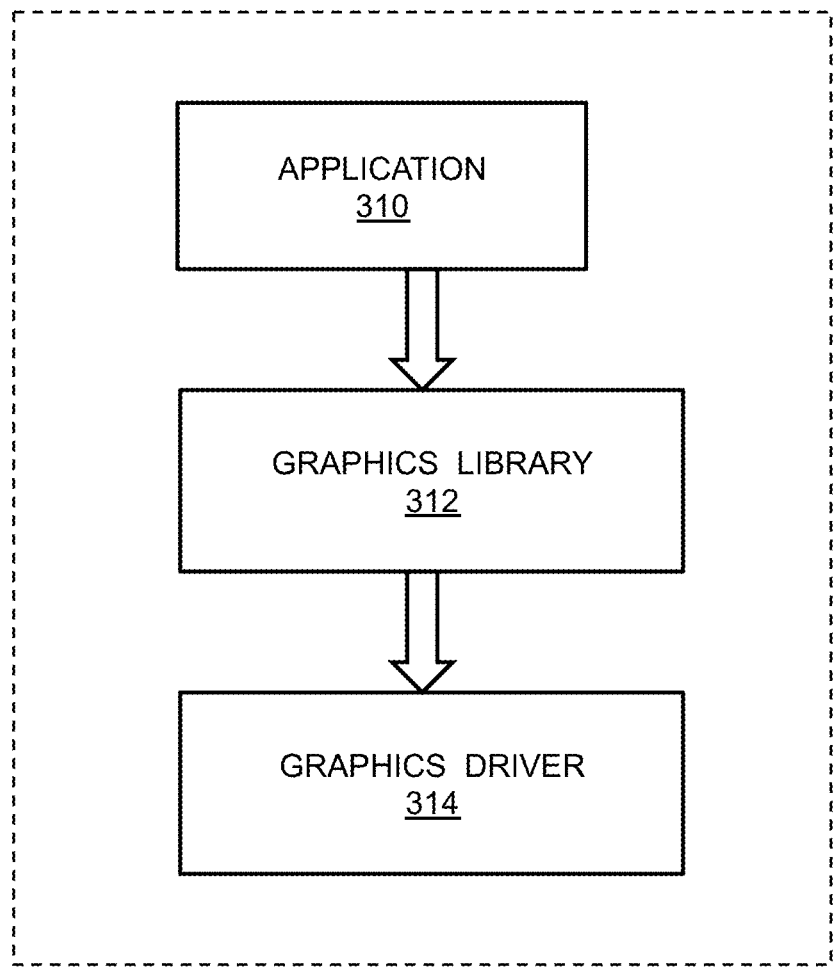

FIGS. 3A and 3B are schematic illustrations of processing performed at a given user-wearable device and a given receiving user device, respectively, in accordance with an embodiment of the present disclosure.

With reference to FIG. 3A, a 3-D application 302 executes in operation on computing hardware of the given user-wearable device. In operation, when the 3-D application 302 makes one or more drawing calls to a graphics library 304, which, in turn, makes one or more drawing calls to a graphics driver 306 of the given user-wearable device, an API or extension 308 intercepts these drawing calls.

With reference to FIG. 3B, an application 310 executes in operation on computing hardware of the given receiving user device. The application 310 receives the intercepted drawing calls, and makes appropriate drawings calls to a graphics library 312, which, in turn, calls upon a graphics driver 314 of the given receiving user device so as to render images on a display arrangement of the given receiving user device. Optionally, in this regard, the application 310 modulates camera and projection matrices of the intercepted drawing calls based upon a current position and angular orientation and/or turning angle of a head of a user associated with the given receiving user device.

This enables the given receiving user device to render the images even without a 3-D application that is similar to the 3-D application 302.

FIGS. 3A and 3B are merely examples, which should not unduly limit the scope of the claims herein. A person skilled in the art will recognize many variations, alternatives, and modifications of embodiments of the present disclosure.

Figure 4:
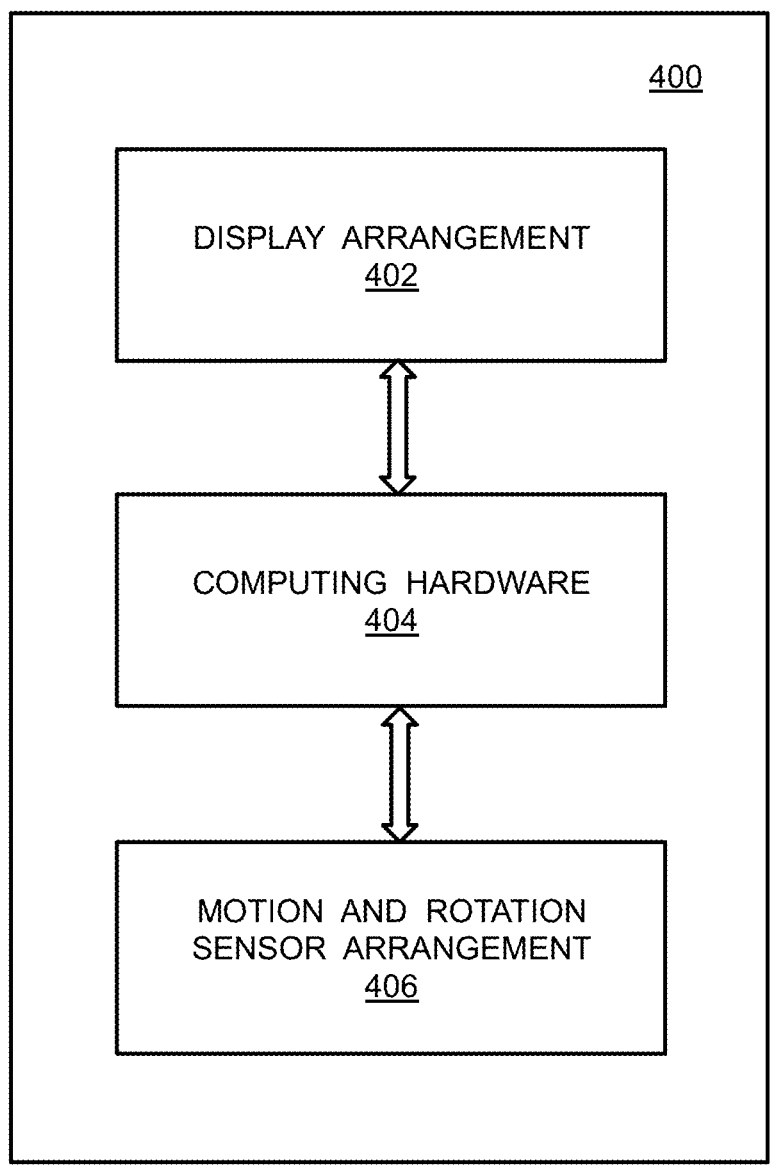
FIG. 4 is a schematic illustration of a user-wearable device, in accordance with an embodiment of the present disclosure.

FIG. 4 is a schematic illustration of a user-wearable device 400, in accordance with an embodiment of the present disclosure.

The user-wearable device 400 includes a display arrangement 402, computing hardware 404 and an in-built motion and rotation sensor arrangement 406. The in-built sensor arrangement 406 optionally includes at least one gyroscope that is implemented as a vibrating Silicon micromachined device, and at least one accelerometer that is optionally implement as a Silicon micromachined device with at least one proof mass. Yet alternatively, the at least one gyroscope is implemented as an optical fiber ring gyroscopic device.

In operation, the computing hardware 404 receives, from a computing arrangement, two images having a substantially hemi-spherical field of view. Optionally, the two images are received as a single combined image.

In operation, the motion and rotation sensor arrangement 406 senses a position and an angular orientation and/or turning angle of a head of a user when the user-wearable device 400 is worn on the head. Accordingly, the computing hardware 404 is operable to render a portion of each of the two images that corresponds to the sensed position and the sensed angular orientation and/or turning angle of the head of the user, for display to a corresponding eye of the user via the display arrangement 402.

FIG. 4 is merely an example, which should not unduly limit the scope of the claims herein. A person skilled in the art will recognize many variations, alternatives, and modifications of embodiments of the present disclosure.

Figure 5:
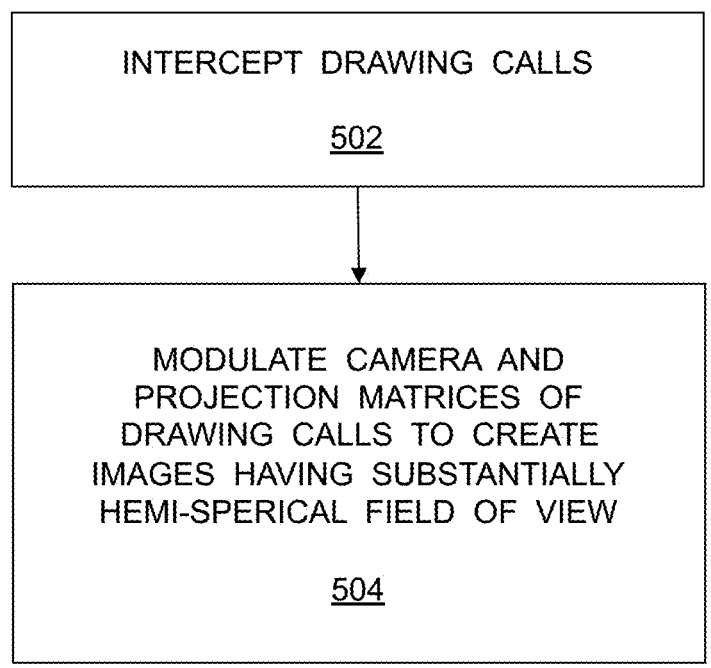
FIG. 5 is an illustration of steps of a method of operating a system for providing virtual reality content, in accordance with an embodiment of the present disclosure.

FIG. 5 is an illustration of steps of a method of operating a system for providing virtual reality content, in accordance with an embodiment of the present disclosure. The method is depicted as a collection of steps in a logical flow diagram, which represents a sequence of steps that can be implemented in hardware, software, or a combination thereof.

The system includes a computing arrangement that is operable to execute image generating instructions to process the virtual reality content to generate image data, and a display arrangement that is operable to receive the generated image data and to provide one or more corresponding images that are viewed by a user in operation for receiving a virtual reality experience.

At a step 502, the computing arrangement operates to execute the image generating instructions to intercept one or more drawing calls to one or more graphics libraries from application software that executes in operation in computing hardware of a user-wearable device of the system, or to intercept one or more drawing calls from the one or more graphics libraries to a graphics driver of the display arrangement, wherein the user-wearable device includes the display arrangement.

At a step 504, the computing arrangement operates to execute the image generating instructions to modulate camera and projection matrices of the one or more drawing calls to create two images having a substantially hemi-spherical field of view for presentation to corresponding eyes of the user.

The steps 502 to 504 are only illustrative and other alternatives can also be provided where one or more steps are added, one or more steps are removed, or one or more steps are provided in a different sequence without departing from the scope of the claims herein.

Figure 6:
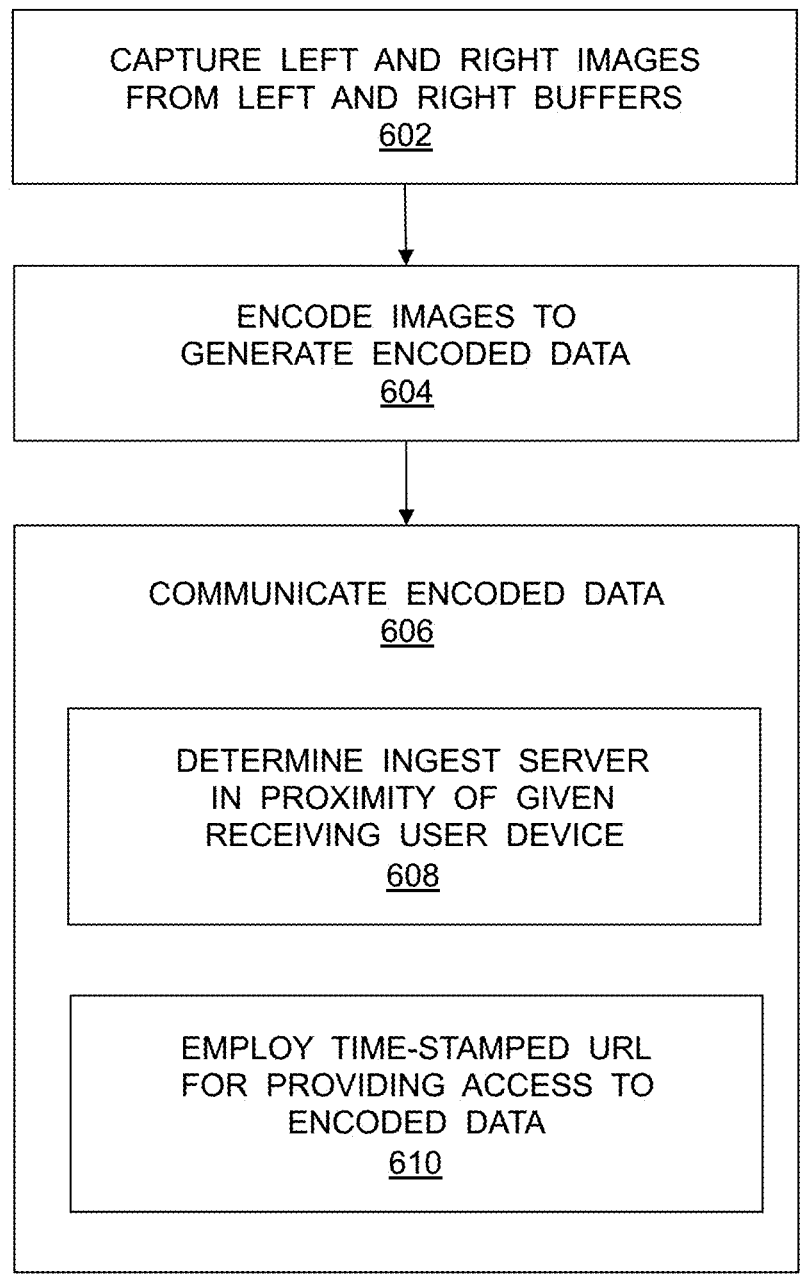
FIG. 6 is an illustration of steps of a method of using a system for providing a virtual reality experience to users, in accordance with an embodiment of the present disclosure.

FIG. 6 is an illustration of steps of a method of using a system for providing a virtual reality experience to users, in accordance with an embodiment of the present disclosure. The method is depicted as a collection of steps in a logical flow diagram, which represents a sequence of steps that can be implemented in hardware, software, or a combination thereof.

The system includes a plurality of user devices coupled via a data communication network arrangement to a data server arrangement, wherein each user device includes computing hardware that is operable to execute program instructions to present to its user left and right images for providing the user with a 3-D viewing experience.

At a step 602, the computing hardware of a given user device operates to execute the program instructions to capture the left and right images from left and right data buffers of the given user device.

At a step 604, the captured images are encoded to generate encoded data.

At a step 606, the encoded data is communicated via the data communication network arrangement and the data server arrangement to other user devices for subsequent decoding and rendering thereat.

The step 606 includes a step 608 at which the data server arrangement operates to determine, for a given receiving user device, an ingest server of the data server arrangement that is in a proximity of the given receiving user device.

The step 606 also includes a step 610 at which the data server arrangement operates to employ a time-stamped URL for providing access to the encoded data.

The steps 602 to 610 are only illustrative and other alternatives can also be provided where one or more steps are added, one or more steps are removed, or one or more steps are provided in a different sequence without departing from the scope of the claims herein.

Figure 7A:
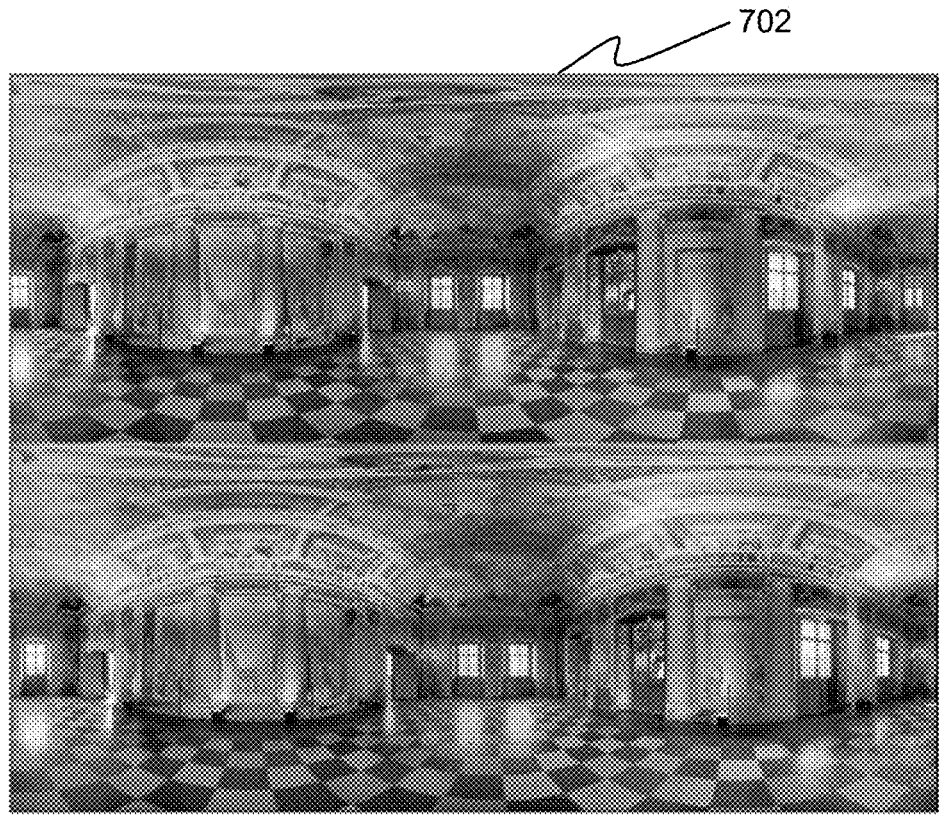
FIGS. 7A and 7B collectively are a schematic illustration of an example of how two images are rendered into a single combined image, and how a portion of the images is displayed for providing a virtual reality experience to a user, in accordance with an embodiment of the present disclosure.
Figure 7A:
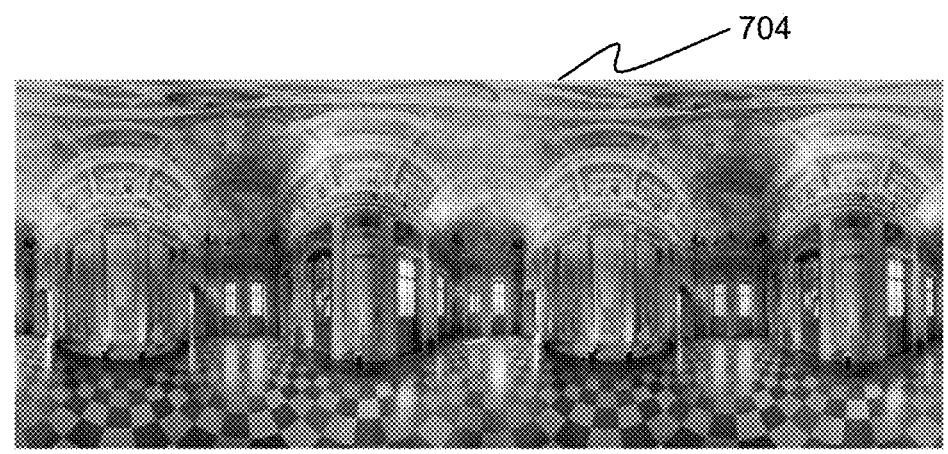
Figure 7B:
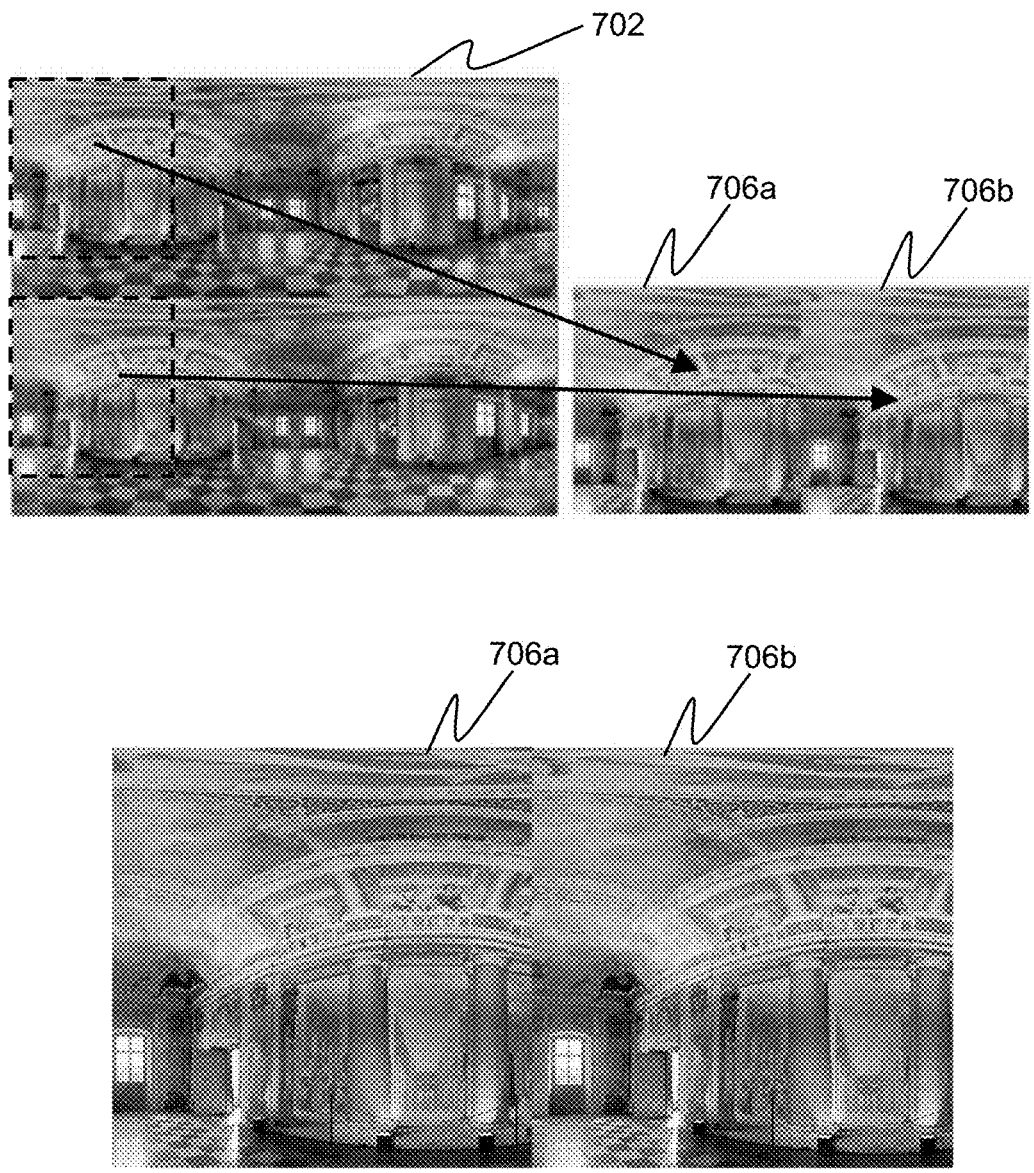

FIGS. 7A and 7B collectively are a schematic illustration of an example of how two images are rendered into a single combined image, and how a portion of the images is displayed for providing a virtual reality experience to a user, in accordance with an embodiment of the present disclosure.

In FIG. 7A, there are shown a first combined image 702 in which the two images are rendered in a top-down manner, and a second combined image 704 in which the two images are rendered in a side-by-side manner.

With reference to FIG. 7B, portions 706a and 706b of the two images are selected from the first combined image 702 based upon a view point and a view direction of a user, for display to a corresponding eye of the user.

FIGS. 7A and 7B are merely examples, which should not unduly limit the scope of the claims herein. A person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for providing virtual reality content, wherein the system includes a computing arrangement that is operable to execute image generating instructions to process the virtual reality content to generate image data, and a display arrangement that is operable to receive the generated image data and to provide one or more corresponding images that are viewed by a user in operation for receiving a virtual reality experience, wherein the computing arrangement, when executing the image generating instructions, is operable:

(i) to intercept one or more drawing calls to one or more graphics libraries from application software that executes in operation in computing hardware of a user-wearable device of the system, or to intercept one or more drawing calls from the one or more graphics libraries to a graphics driver of the display arrangement, wherein the user-wearable device includes the display arrangement; and (ii) to modulate camera and projection matrices of the one or more intercepted drawing calls to create two images, each having a substantially hemi-spherical field of view for presentation to corresponding eyes of the user, wherein the computing arrangement, when executing the image generating instructions, is operable to render the two images into a single combined image, wherein the system is operable to encode the two images or the single combined image to generate corresponding encoded data, and to communicate the encoded data via a data communication network to user devices of one or more other users located at mutually different spatial locations, and wherein the system is operable to time stamp one or more of the two images, the single combined image, and the encoded data, for temporally synchronizing presentation of the images to the user and the one or more other users mutually to synchronize their virtual reality experiences.

2. The system of claim 1, wherein the system is operable to communicate information indicative of the intercepted drawing calls to user devices of one or more other users located at mutually different spatial locations, via a data communication network.

3. The system of claim 1, wherein the user-wearable device includes an in-built motion and rotation sensor arrangement that is operable to sense a position and an angular orientation and/or turning angle of a head of the user when the user-wearable device is worn on the head.

4. The system of claim 3, wherein the computing hardware of the user-wearable device is operable to render a portion of each of the two images that corresponds to the sensed position and the sensed angular orientation and/or turning angle of the head of the user, for display to a corresponding eye of the user to provide the virtual reality experience.

5. The system of claim 4, wherein the computing hardware of the user-wearable device is operable to apply a spherical distortion correction to the portion before display to the corresponding eye of the user via the display arrangement.

6. The system of claim 1, wherein the computing arrangement, when executing the image generating instructions, is operable:
   (iii) to receive from user devices of one or more other users interactive feedback data indicative of at least one of: a position of a head of a given user, an angular orientation and/or turning angle of the head of the given user, an input provided by the given user; and
   (iv) to modify the two images based upon the interactive feedback data.

7. A user-wearable device that is operable to interact with the system of claim 1, wherein the user-wearable device includes computing hardware and a display arrangement, wherein the computing hardware is operable to execute program instructions for intercepting one or more drawing calls to a graphics driver of the display arrangement and/or to one or more graphics libraries supporting operation of the display arrangement, wherein the computing hardware is operable to execute the program instructions to provide a three-dimensional (3-D) virtual reality experience to one or more users via the display arrangement and/or to encode 3-D virtual reality display data into corresponding encoded data to be communicated via a data communication network to other such user-wearable devices.

8. A method of operating a system for providing virtual reality content, wherein the system includes a computing arrangement that is operable to execute image generating instructions to process the virtual reality content to generate image data, and a display arrangement that is operable to receive the generated image data and to provide one or more corresponding images that are viewed by a user in operation for receiving a virtual reality experience, the method comprising:
   operating the computing arrangement to execute the image generating instructions to intercept one or more drawing calls to one or more graphics libraries from application software that executes in operation in computing hardware of a user-wearable device of the system, or to intercept one or more drawing calls from the one or more graphics libraries to a graphics driver of the display arrangement, wherein the user-wearable device includes the display arrangement;
   operating the computing arrangement to execute the image generating instructions to modulate camera and projection matrices of the one or more intercepted drawing calls to create two images, each having a substantially hemi-spherical field of view for presentation to corresponding eyes of the user;
   operating the computing arrangement to execute the image generating instructions to render the two images into a single combined image;
   operating the system to encode the two images or the single combined image to generate corresponding encoded data, and to communicate the encoded data via a data communication network to user devices of one or more other users located at mutually different spatial locations; and
   operating the system to time stamp one or more of the two images, the single combined image, and the encoded data, for temporally synchronizing presentation of the images to the user and the one or more other users mutually to synchronize their virtual reality experiences.

9. The method of claim 8, wherein the method includes operating the system to communicate information indicative of the intercepted drawing calls to user devices of one or more other users located at mutually different spatial locations, via a data communication network.

10. The method of claim 8, wherein the method includes operating an in-built motion and rotation sensor arrangement of the user-wearable device to sense a position and an angular orientation and/or turning angle of a head of the user when the user-wearable device is worn on the head.

11. The method of claim 10, wherein the method includes operating the computing hardware of the user-wearable device to render a portion of each of the two images that corresponds to the sensed position and the sensed angular orientation and/or turning angle of the head of the user, for display to a corresponding eye of the user to provide the virtual reality experience.

12. The method of claim 11, wherein the method includes operating the computing hardware of the user-wearable device to apply a spherical distortion correction to the portion before display to the corresponding eye of the user via the display arrangement.

13. The method of claim 8, wherein the method includes operating the computing arrangement to execute the image generating instructions to receive from user devices of one or more other users interactive feedback data indicative of at least one of: a position of a head of a given user, an angular orientation and/or turning angle of the head of the given user, an input provided by the given user, and to modify the two images based upon the interactive feedback data.

14. A computer program product comprising a non-transitory computer-readable storage medium having computer-readable instructions stored thereon, the computer-readable instructions being executable by a computerized device comprising processing hardware to execute the method of claim 8.

15. A system for providing a virtual reality experience to users, wherein the system includes a plurality of user devices coupled via a data communication network arrangement to a data server arrangement, wherein each user device includes computing hardware that is operable to execute program instructions to present to its user left and right images for providing the user with a three-dimensional (3-D) viewing experience, and wherein the data server arrangement includes a server computing arrangement for processing data thereat, wherein
   the computing hardware of a given user device, when executing the program instructions, is operable:
   to capture the left and right images from left and right data buffers of the given user device;
   to render the left and right images into a single combined image;
   to encode the captured left and right images or the single combined image to generate encoded data;
   to communicate the encoded data via the data communication network arrangement and the data server arrangement to other user devices located at mutually different spatial locations for subsequent decoding and rendering thereat; and to time stamp one or more of the two images, the single combined image, and the encoded data, for temporally synchronizing presentation of the images to the user and the one or more other users mutually to synchronize their virtual reality experiences, wherein the data server arrangement is operable to determine, for a given receiving user device, an ingest server of the data server arrangement that is in a proximity of a geographical location of the given receiving user device, and to employ a time-stamped Universal Resource Locator (URL) pertaining to the ingest server for providing access to the encoded data.

16. The system of claim 15, wherein the computing hardware of the plurality of user devices, when executing the program instructions, are operable to render a given virtual reality experience mutually simultaneously via communication of the encoded data via the data communication network arrangement and the data server arrangement.

17. The system of claim 15, wherein the given user device includes a graphics board driver, and the computing hardware of the given user device, when executing the program instructions, is operable:
 (iv) to intercept one or more drawings calls to the graphics board driver from a 3-D application that executes in operation in the computing hardware of the given user device;
 (v) to modulate the one or more drawing calls to generate a second camera perspective image from a first camera perspective image; and
 (vi) to render the first and second camera perspective images into left and right back buffers, respectively, in preparation for swapping of corresponding front buffers with the back buffers, wherein the front buffers and the back buffers are used when generating images for display on a display arrangement of the given user device.

18. A method of using a system for providing a virtual reality experience to users, wherein the system includes a plurality of user devices coupled via a data communication network arrangement to a data server arrangement, wherein each user device includes computing hardware that is operable to execute program instructions to present to its user left and right images for providing the user with a three-dimensional (3-D) viewing experience, and wherein the data server arrangement includes a server computing arrangement for processing data thereat, characterized in that the method includes:
 operating the computing hardware of a given user device to execute the program instructions to capture the left and right images from left and right data buffers of the given user device;
 rendering the left and right images into a single combined image;
 encoding the captured left and right images or the single combined image to generate encoded data;
 communicating the encoded data via the data communication network arrangement and the data server arrangement to other user devices located at mutually different spatial locations for subsequent decoding and rendering thereat;
 time stamping one or more of the two images, the single combined image, and the encoded data, for temporally synchronizing presentation of the images to the user and the one or more other users mutually to synchronize their virtual reality experiences;
 operating the data server arrangement to determine, for a given receiving user device, an ingest server of the data server arrangement that is in a proximity of a geographical location of the given receiving user device; and
 operating the data server arrangement to employ a time-stamped Universal Resource Locator (URL) pertaining to the ingest server for providing access to the encoded data.

19. The method of claim 18, wherein the method includes operating the computing hardware of the plurality of user devices to execute the program instructions to render a given virtual reality experience mutually simultaneously via communication of the encoded data via the data communication network arrangement and the data server arrangement.

20. The method of claim 18, wherein the given user device includes a graphics board driver, and the method includes:
 (f) operating the computing hardware of the given user device to execute the program instructions to intercept one or more drawings calls to the graphics board driver from a 3-D application that executes in operation in the computing hardware of the given user device;
 (g) operating the computing hardware of the given user device to execute the program instructions to modulate the one or more drawing calls to generate a second camera perspective image from a first camera perspective image; and
 (h) operating the computing hardware of the given user device to execute the program instructions to render the first and second camera perspective images into left and right back buffers, respectively, in preparation for swapping of corresponding front buffers with the back buffers, wherein the front buffers and the back buffers are used when generating images for display on a display arrangement of the given user device.

* * * * *